United States Patent [19]

Knoll

[11] 4,415,136
[45] Nov. 15, 1983

[54] PEDESTAL FOR CONSOLES

[75] Inventor: Peter R. Knoll, Fountain Valley, Calif.

[73] Assignee: Dentronix Systems, Inc., Santa Ana, Calif.

[21] Appl. No.: 262,929

[22] Filed: May 12, 1981

[51] Int. Cl.³ .................................... F16M 11/14
[52] U.S. Cl. ............................... 248/181; 248/663
[58] Field of Search ............ 248/181, 183, 178, 179; 312/196; 403/55

[56] References Cited

U.S. PATENT DOCUMENTS 3,974,994  8/1976  Petterson ........................ 248/663
4,019,710  4/1977  O'Connor et al. ............... 248/181
4,068,961  1/1978  Ebner et al. .................... 248/181 X Primary Examiner—Ramon S. Britts
Assistant Examiner—Sarah A. Lechok
Attorney, Agent, or Firm—Hubbard & Stetina

[57] ABSTRACT

A pedestal for CRT's, video screens, projection consoles, disk drives, and other consoles which have a face or screen permitting limited pivotal and limited forward and back tilt movement, wherein movement is permitted against constant frictional forces sufficient to hold the console in any desired position by means of a hollow partially spherical journal, and bearings in resilient compression against the convex and concave surfaces of the journal.

16 Claims, 6 Drawing Figures

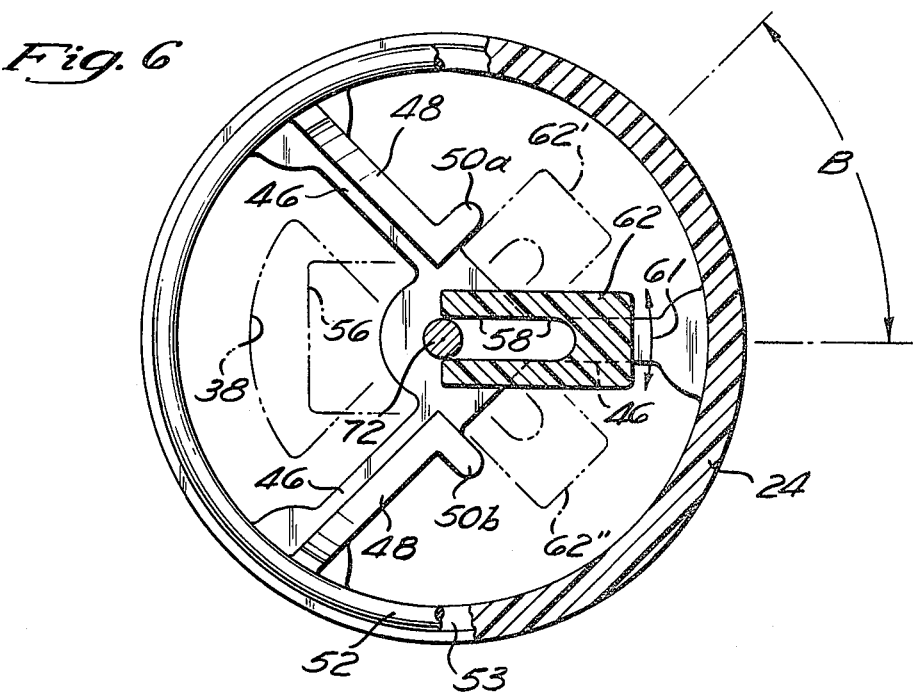
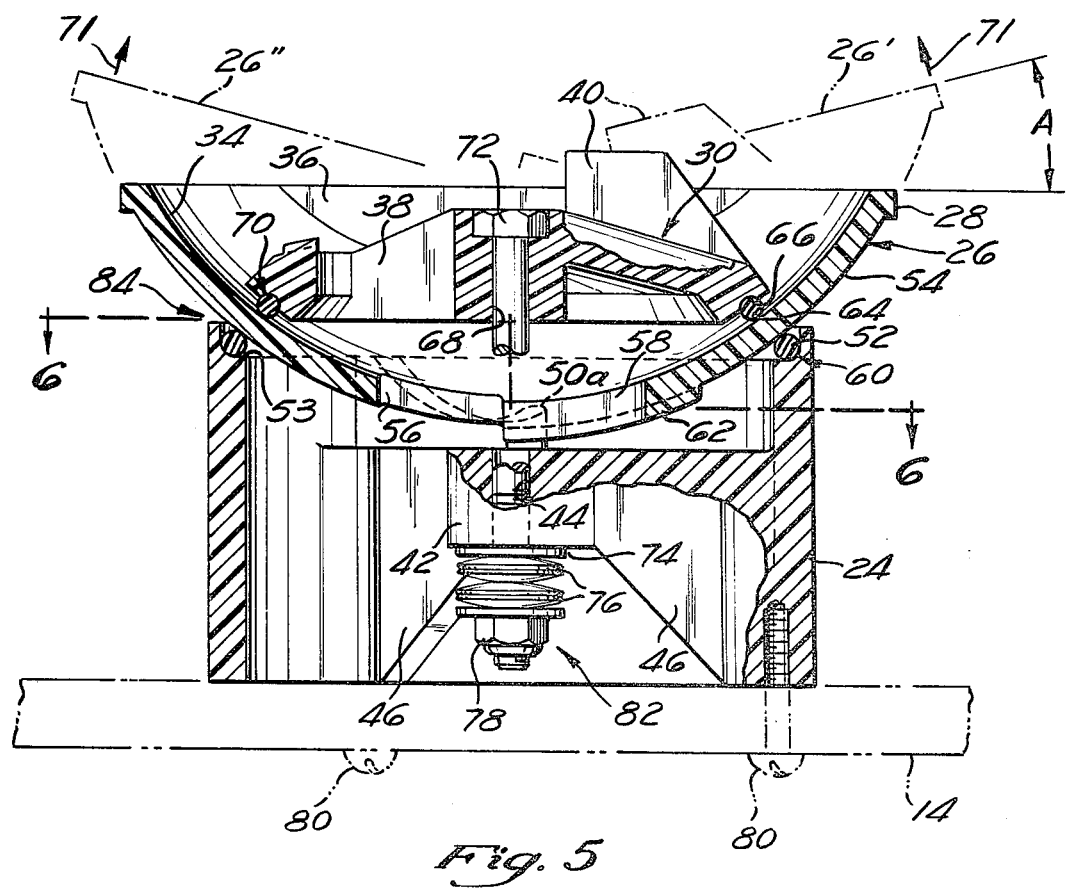

PEDESTAL FOR CONSOLES

TECHNICAL FIELD

This invention relates to pedestals for supporting CRT and video consoles and other consoles in which a face or display screen is provided, to permit the console to be tilted forwardly and backwardly and pivoted from side-to-side.

BACKGROUND OF THE INVENTION

There are substantial advantages to providing a pedestal of some kind to permit a video or CRT console to be tilted and/or pivoted. It may be necessary to pivot the console from side-to-side to permit different operators to view it. It may be necessary to tilt the console forwardly and backwardly according to the height or eye level of the viewer, or to avoid undesired reflections or shadows from windows or lights. Similar advantages are desirable with respect to other consoles, such as disk drives, printers, general computer and office consoles, and the like.

A number of such devices have been proposed and developed. In general, they are of the type in which two separately connected axes are associated in a single structure. For example, one axis permits tilting forwardly and backwardly and another axis permits side-to-side pivoting. These devices, generally, are very expensive and have not been entirely satisfactory in part because of the difficulty in maintaining the position of the console, or because the devices would stick in a given position and be very difficult to move from that position.

Another approach has been to use the swivel ball, a ball secured in some kind of a socket or seat, which permitted both pivoting and tilting in all directions. Neither of these has been entirely satisfactory because the force required to move from one point to another was not always uniform, but depended upon the relative positions of the console at the beginning and end of its desired movement.

These and other defects are overcome by the present invention, in which movement from any desired position for either tilting, forwardly or backwardly, or pivoting side-to-side, or both, requires the same amount of force to be applied and the frictional force resisting movement is sufficient to maintain the console in whatever position is desired. The present invention also provides stops to limit the pivoting and tilting motion of the console to the desired range of movement.

SUMMARY OF THE INVENTION

The present invention comprises a pedestal for adjustably supporting, positioning and orienting consoles, typically CRT, video, projection, and other consoles, for being mounted upon a supporting structure, such as a table, desk, or counter. A hollow, partially spherical journal for supporting a console is supported by the base, and a guide element adapted to rest in the concave portion of the journal is secured on the opposite side of the base. A bearing on the upper end of the base is provided for supporting in frictional sliding relationship the convex surface of the journal, which is generally disposed in a downwardly orientation. A second bearing is provided on the guide element which is supported in a concave, usually upwardly oriented, surface of the journal for riding and frictional relationship against the concave surface of the journal.

These two bearings provide constant frictional bearing surface against the lower, convex surface of the journal and against the upper concave surface of the journal. Means are provided for securing the two bearings in constant compression against the convex and concave surfaces, respectively, of the hollow partially spherical journal to which, in the preferred embodiment and orientation, the display console is attached. The base, journal, guide elements, bearings and compression means are so disposed and constructed as to permit the supported console to be tilted on the pedestal from any desired and available position to any other desired and available position by applying a movement force against constant frictional force as the bearings slide over the concave and convex journal surfces, the friction being sufficient, by reason of the compression applied to the bearings, to maintain the console at any position and orientation without additional means to hold such position.

The bearings preferably comprise low friction, cold flowable, self-lubricating polymeric elements, such as polytetrafluoroethylene or other fluorocarbons. The compression means comprises resilient means, which may be springs, spring washers, or any other resilient means, which are held under compression, but within the limits of a Hook's law resiliency range of said means, to thereby maintain the frictional sliding relationship between the bearings and the journal at a constant or substantially constant coefficient of friction. Thus, the same amount of force is required to move the console from any tilted position to any other tilted position or from any pivoted position to any other pivoted position.

Means are provided on the bearings which coact with stop means on the base for limiting the pivotal movement of the console to less than one-half a rotation, i.e., less than 180 degrees of rotation and, in the preferred embodiment, to no more than 90 degrees of rotation, i.e., 45 degrees of rotation on each side of a center position. Tilt guide means are provided on the journal and stop means are provided on the guide element to substantially prevent side-to-side tilting movement while permitting limited back-to-front tilting movement of the console. Generally, the pedestal is designed to permit the console to be tilted from a generally horizontal attitude, i.e., in which the tilt axis is vertical, to a forwardly tilted position, i.e., in which the tilt axis is up to about 12 or 15 degrees from the vertical.

In the conventional usage, the base is attached to a support surface or stand which, in turn, can be placed on a table or counter. The console is attached to the journal and the journal rides between the first and second bearings, the first bearing being at the upper end of the base, and the second bearing being between the journal and the guide element. In tilting, the journal moves in opposition to frictional forces applied on both sides of the journal, i.e., on a concave surface and on a convex surface of the journal. In pivoting, the forces are applied between the journal and the first bearing, on the convex surface of the journal. In the preferred embodiment, the journal is held under compression between the bearing on the upper end of the base and the second bearing on the guide element by elongate means, such as a bolt, and resilient means, such as spring washers or other spring devices, which are under compression within their Hooke's law range. Within the Hooke's law range, a change in amount of resilient compression or extension does not change the force exerted compressively upon the bearings. Thus, the compression force upon the bearings is substantially constant at all positions and, in addition, if the bearings should wear or their dimension change as a result of cold flow, which is a characteristic of polytetrafluoroethylene, the change is compensated for by the Hooke's law range of the resilient compression means holding the journal in compression between the bearings.

In the preferred embodiment, the bearings are annular O-rings made out of a self-lubricating polymer, such as polytetraflurorethylene; however, other self-lubricating materials and other configurations may be used. For example, a plurality of spaced self-lubricating bearing portions may be positioned to ride over the concave and/or convex surfaces of the journal. The annular configuration of the bearings is a convenient and effective design but is not critical to the operation of the invention.

Also in the preferred embodiment, another means is provided for engagement in the base of the console to fix the console in its orientation with respect to the guide disk. Thus, as the console is pivoted about the axis of the longitudinal compression means, the guide means pivots with it, and the pivotal action is accommodated by frictional sliding between the lower bearing and the journal. On the other hand, as the console is tilted, the journal moves under constant compression and against constant frictional forces, between both the upper bearing and the lower bearing.

Thus, the present pedestal is constructed and adapted to support a display for pivotal movement left-to-right about a generally vertical axis, and to permit back-to-front tilting movement, by providing a journal comprising a partially spherical hollow portion having a convex surface on one side and a concave surface on the other side. There is also provided first support means comprising means for supporting the pedestal and means for frictionally engaging one surface of the hollow portion. A second means comprises means for frictionally engaging the other surface of the hollow portion. In addition, a compressing means holds the frictional engaging means in constant frictional contacting relationship with the respective surfaces of the hollow portion to permit it to move relative to the frictional engaging means by constant sliding friction during movement. Moreover, there is provided means for supporting the display in a predetermined relationship relative to the journal.

BRIEF DESCRIPTION OF THE DRAWINGS

FIG. 5 is a cross-sectional view of the pedestal of this invention showing its attachments to a support surface, and showing the various tilting relationships available.

FIG. 5 is a top view of the pedestal of this invention taken along the offset line 6—6, the right side in cross-section along the lower of the offset portion of line 6—6, the left side with the journal removed, taken along the higher portion of the offset line 6—6, the offset occurring at the center of the figure as shown.

DETAILED DESCRIPTION OF THE PREFERRED EMBODIMENT

Figure 1:
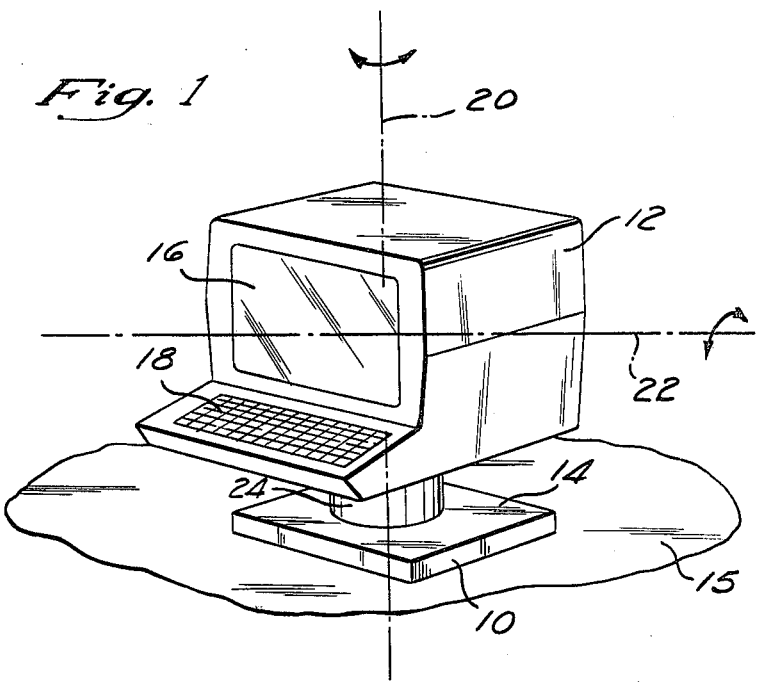
FIG. 1 is a perspective view of a console being supported by the pedestal of this invention.

FIG. 1 illustrates the pedestal 10 of the present invention designated generally by the numeral 10 in FIG. 1 serving as a mounting or stand for a typical CRT 12. The pedestal 10 is mounted on a support surface or stand 14, which in turn can be placed on a stand or larger planar support surface 15, such as a desk, table, bench, and the like. As described above, the purpose of the pedestal 10 is to permit adjustment in the position of the CRT 12 in order to facilitate the user's vision of the screen 16 or the use of the keyboard 18. Thus, the pedestal 10 of the present invention permits the CRT 12 to be pivoted about a vertical axis 20 or tilted about a horizontal transverse axis 22 which is roughly parallel to the face of the screen 16, as shown by the arrows in FIG. 1.

Figure 2:
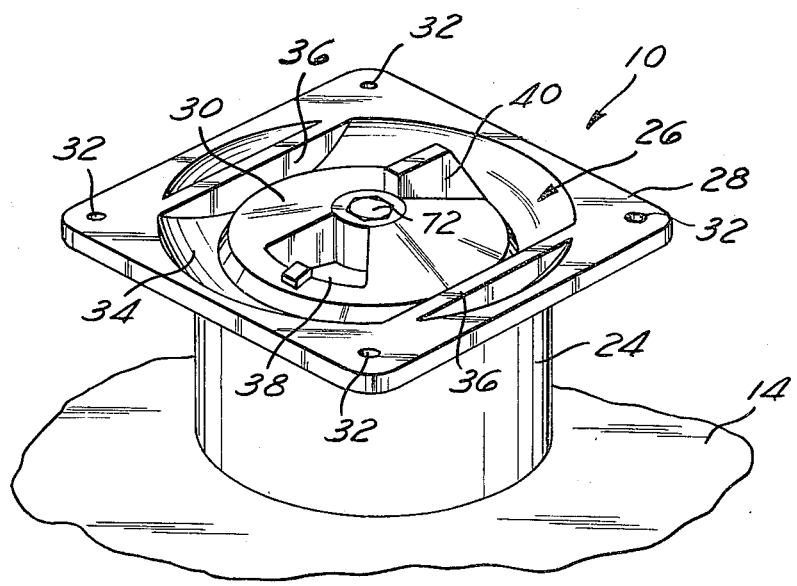
FIG. 2 is a perspective view of the pedestal of this invention with the console removed.

FIG. 2 illustrates the present pedestal 10 with the CRT 12 removed, the upper right hand edge of the pedestal corresponding to the front of the display control. The pedestal 10 is comprised of a cylindrical base 24, a hollow partial hemispherical journal 26, including a large flange 28, and a circular guide disk 30. The base 24 is attached to the support surface 14 by means of screws (not shown) which are inserted into it from underneath the support surface 14, as illustrated in FIG. 5. The large flange 28 surrounds the upper circumference of the journal 26 and contains a hole 32 in each corner for mounting the pedestal 10 on the under surface of the CRT 12.

As shown in FIG. 2, the guide disk 30 is inserted into the hollow concave portion of the journal 26 and engages the concave surface 34 thereof. It rides between a pair of vertical guide walls 36 located on either side of the concave portion of the journal 26. The guide disk 30 has a generally triangular opening 38 which permits the passage of an electrical signal or power cord (not shown) to the CRT 12. In addition, located on the upper surface of the guide disk 30 is a large tab 40 which is inserted into a slot (not shown) on the under surface of the CRT. Thus, as the CRT and flange 28 pivot, the guide disk 30 rotates an equal amount, thus maintaining the alignment between the passage 38 in the guide disk and other aligned passages in the journal 26 and base 24. This feature of the present invention will be described in more detail in connection with FIG. 6.

Figures 3, 4:
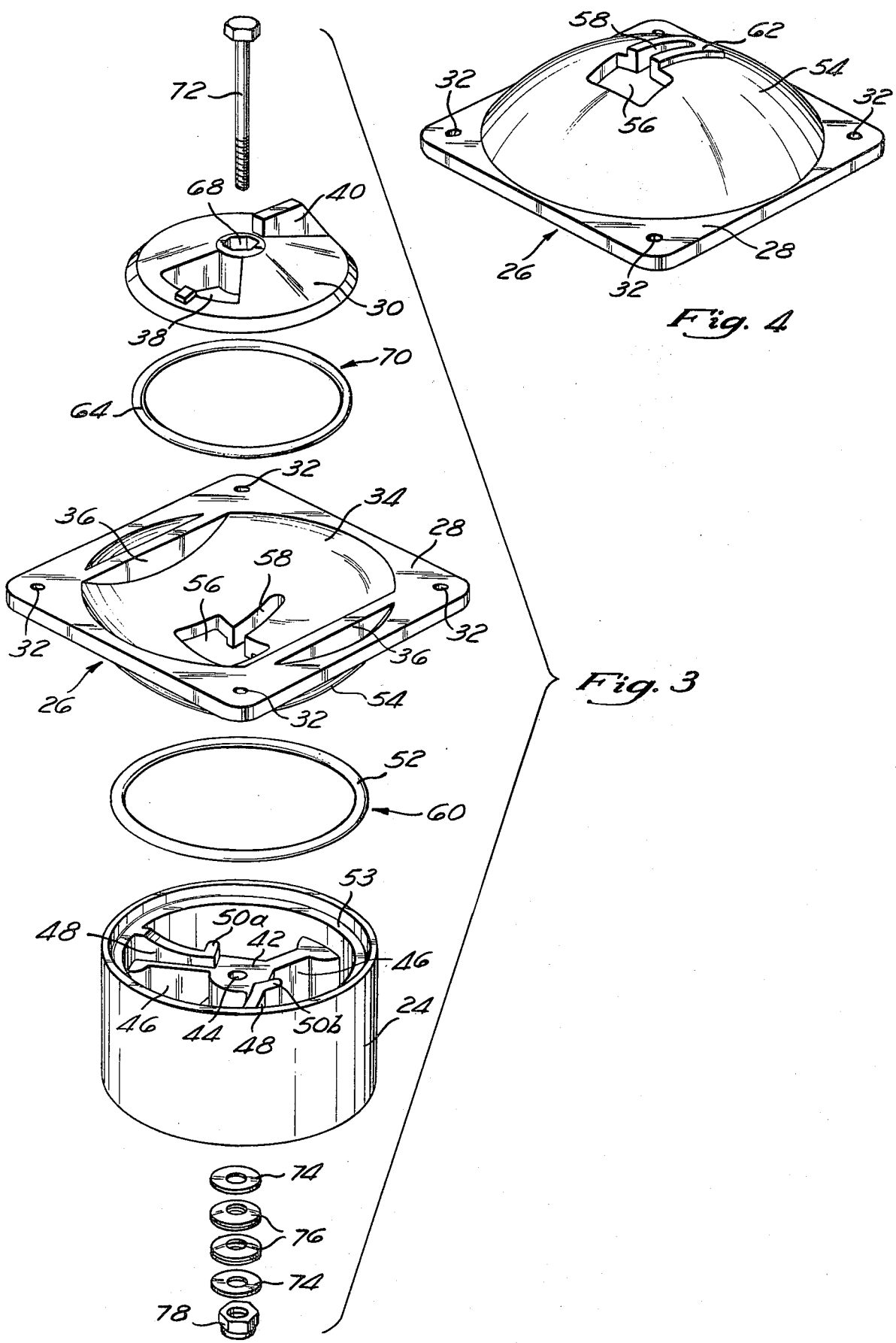
FIG. 3 is an exploded view of the pedestal of this invention showing the elements thereof, the journal being shown in its normal orientation, concave surface upwardly oriented.
FIG. 4 is the journal of the invention inverted from its position in FIG. 3, showing the normally downwardly oriented convex surface inverted in an upwardly facing position to show the details of the structure on convex surface thereof.

The exploded view of FIG. 3 reveals the assembly of the present pedestal. The base 24 has a central section 42 in which a vertical hole 44 is formed. The base 24 is strengthened by three radial ribs 46 and 47 which are equally circumferentially spaced from the central section 42 radially to form a reinforced abutment on the cylindrical walls. On the upper surface of two of these three ribs 46, there is provided a ridge 48 extending from the side wall of the base 24 and terminating in swivel stops 50a and 50b.

An O-ring 52 is inserted in an annular ledge 53 located near the upper edge of the base 24, thereby forming the lower annular bearing 60. The convex surface 54 of the journal 26, which is best illustrated in FIG. 4, rides in and is supported by this lower annular bearing 60.

FIGS. 3 and 4 illustrate a generally rectangular passage 56 in the journal which is aligned with the generally triangular passage 38 in the guide disk 30. In addition, a slot 58 is also formed in the journal 26 beginning at or near the center of the journal adjacent the rectangular opening 56. This slot 58 permits the journal, and consequently the CRT display console to tilt forward, as shown in FIG. 1, this functions being explained in more detail below. In addition, FIG. 4 illustrates a U-shaped lug 62 which surrounds the slot 58 formed on the convex surface 54 of the journal 26. This lug 62 coacts with the swivel stop devices 50a and 50b to limit the degree of the pivotal movement of the console on the pedestal.

As shown in FIG. 3, another O ring 64 is inserted into an annular groove 66 (shown in FIG. 5) on the lower surface of the guide disk 30 comprising the upper annular bearing 70. The guide disk 30 is inserted in the hollow concave portion of the journal 26 with the O ring 64 engaging the concave surface 34 thereof. The guide disk 30 is provided with a vertical passage 68, one end of which is hexagonal in cross section, to prevent the head of a bolt 72 from rotating. The bolt 72 extends down through the passage 68 in the guide disk 30, the slot 58 in the journal 26, and the hole 44 in the base 24 joining the pedestal 10 together. A pair of flat washers 74, are separated by two pair of cup spring washers 76 on the end of the bolt 72, and all are secured by a nut 78. Although cup spring or conical washers are preferred, other types of washers, such as crescent workers (cylindrically curved) or wave washers, can also be utilized to provide the desired spring force and resiliency along the center bolt 72 which, in turn, provides the constant and uniform compression of the bearings 60 and 70 against the journal 26. Such washers are commercially available from the Seastrim Manufacturing Co., Inc., of Glendale, Calif.

A significant feature of the present invention is that the spring force provided by the washers 76 or other equivalent means varies within the Hooke's law range; that is, within the elastic range, deformation of the spring is proportional or linear to the force applied. Thus, within this range, the compressive forces between the bearings 60 and 70 and journal 26 will be constant and sufficient to hold the CRT in any desired postion. In addition, the spring force compensates for dimensional differences in the joint of the present pedestal, caused, for example, by wear, tolerance differences, cold flow of the joint material, paint removal, and differences in wall thickness of the journal 26 along its partially spherical, curved surface.

FIG. 5 illustrates the manner in which the pedestal 10 is mounted on a support surface 14. The base 24 is secured to the support surface 14 by means of screws 80 which are inserted into holes in the base 24 from underneath the support surface 14. Preferably, three such screws 80 are formed in the base at the locations of the three radial ribs 46; however, other hole configurations are possible. The guide disk 30 is held firmly against the journal 26 by the bolt 72 and the cup spring washer assembly 82. Thus, if the CRT is portable, it can be lifted and moved and the pedestal 10 will remain mounted beneath it.

The tilt operation of the present pedestal is also illustrated in FIG. 5. The joint 84 of the present pedestal 10 is formed by the simultaneous movement of the hemispherical journal 26 in the lower and upper annular bearings, 60 and 70, respectively. The lower bearing 60, on which the convex surface 54 of the journal 26 rides, is comprised of an O-ring 52 which is supported on a ledge 53 at the upper circumference of the base 24. The upper bearing 70, on which the concave surface 34 of the journal 26 rides, is comprised of an O-ring 64 inserted into an annular groove 66 on the under surface of the guide disk 30.

Thus, as the position of the CRT is tilted, the movement of the journal 26 is supported and guided by these two bearings 60 and 70. In essence, the journal can be rocked back and forth on these bearings 60 and 70, as indicated by the arrows 71 shown in FIG. 5. For example, in order to adjust the angle of inclination of the CRT's screen downward, the CRT is tilted forwardly about the horizontal axis 22 shown in FIG. 1, thus causing the journal 26 to move between the bearings 60 and 70 and to assume the dotted line position 26' shown in FIG. 5. Conversely, if a user desires to adjust the screen of the CRT upward, the CRT is simply rotated backward about the same axis 22, causing the journal 26 to move between the bearings 60 and 70 and to assume the dotted line position 26''. The journal 26 can be adjusted to any tilt position between these two extreme positions 26' and 26''. Thus, an angle of tilt A as measured from the horizontal, is produced in order to adjust the angle of inclination of the vertical plane of the screen of the CRT. Preferably, this tilt angle A is 7 to 12 degrees in either direction; however, other desired tilt angles A can be accomplished by the principles of the present invention.

As illustrated in FIG. 5, the amount of surface contact between the journal 26 and the bearings 60 and 70 for any CRT position is constant. Thus, the present pedestal 10 provides secure, fully supported movement of the journal 26 with uniform frictional characteristics from position to position. In addition, because the hemispherical journal 26 can rotate in the upper and lower bearings 70 and 60, respectively, these same advantages are also obtained for the left-right pivot adjustment, which will be described in connection with FIG. 6. Furthermore, the compressive forces exerted on the journal 26 by the bearings 60 and 70 are strong enough to maintain even the most extreme CRT tilt positions, while still permitting easy tilt adjustment. These forces are produced by the tight engagement of the upper bearing 70 against the journal 26. The O-rings 52 and 64 are constructed from a self-lubricating material resulting in low, constant frictional forces on the surfaces 34 and 54 of the journal 26, thus reducing wear and increasing durability of the pedestal 10. Preferably, these O-rings 52 and 64 are constructed from polytetrafluoroethylene, e.g., Teflon (a trademark of the DuPont Company), although other materials can be utilized. Polytetrafluoroethylene polymers and other fluorocarbon polymers are preferred for toughness, self lubricity and wear resistance. Cold flow is compensated for by resiliency in the washers 76 which are flexed within their Hooke's law region. The journal 26 and other components of the present pedestal can be inexpensively injection molded from a rigid styrene foam, which exhibits good durability characteristics. Other rigid materials may be used, however.

As the CRT is adjusted for tilt, the bolt 72 moves within the slot 58. This relationship is best illustrated in FIG. 6 which shows both the bolt 72 and lug 62 (which surrounds the slot 58) in cross section. At the extreme downward or forward position 26' of the journal 26 (see FIG. 5), the bolt 72 may even enter the power cord opening 56 adjacent the slot 58. In addition, the upper end of the slot 58, acting in conjunction with the bolt 72, serves as a stop device for preventing forward tilting of the journal 26 beyond the extreme position 26" shown in FIG. 5. The interaction between the bolt 72 and the slot 58 prevents the journal 26, and consequently the console 12, from left-right pivoting about a horizontal axis other than the transverse axis 22 illustrated in FIG. 1. This advantageous result is further obtained by the interplay between the guide walls 36 and the guide disk 30, as illustrated in FIGS. 2 and 5, which prevents or substantially prevents side to side movement of the guide means 30. That is, the positioning of the guide disk 30 between the guide walls 36, permits the journal to rotate only about a horizontal axis perpendicular the plane of the walls. Thus, there are no interfering parts or CRT positions permitted which may cause the present pedestal 10 to jam or stick.

FIG. 6 illustrates the operation of the left-to-right pivot movement of the console on the journal of the present invention. The journal 26 rides in the lower bearing 60 as the CRT is swivelled about the generally vertical axis 20, shown in FIG. 1, which corresponds to the longitudinal axis of the bolt 72. For any available tilt and/or pivot position, the journal 26 rides in and is fully supported by the bearings 60 and 70. Therefore, the surface contact between the journal and bearings 60 and 70 for any CRT position is constant, thus providing the advantageous uniform frictional characteristics of the present invention.

The degree of pivot adjustment is determined by the location of the step devices 50a and 50b located at the ends of the two ridges 48. As the CRT is pivoted, the lug 62 on the journal 26 contacts these stop devices 50 to prevent further rotation. These stop devices 50 are, of course, not required for the effective operation of the present pedestal. It should be noted, however, that they do serve to protect any electrical wiring passing through the pedestal and are fully operational regardless of the tilt position of the CRT. In the preferred embodiment, the swivel angle B is about 45 degrees in either direction from a central location, as illustrated by the arrow 61 and the dotted line positions 62' and 62" of the lug 62, a total adjustment of 90 degrees. However, other desired swivel angles B can be easily accomplished.

A significant advantage of the present invention is the provision for an unobstructed opening for an electrical power cord running to the CRT. FIG. 6 illustrates in dotted lines the pie shaped opening 38 in the guide disk 30 and the aligned rectangular opening 56 in the journal 26, both of which are also illustrated in FIG. 5. For any CRT position, these openings 38 and 56 remain between the large space separating the two ribs 46. Thus, there is a clear passage for an electrical cord to be connected to the CRT, if desired. When the CRT is swivelled, the large tab 40 on the upper surface of the guide disk 30 causes the guide disk 30 to rotate with the journal 26, thus maintaining the alignment between these openings 30 and 56. In addition, when the CRT is adjusted for tilt, the openings are large enough to prevent the cord from being pinched or squeezed, thus preventing damage to the cord.

In the preferred embodiment described above, specific materials are recommended, but these are not critical to the invention and the major elements of the pedestal can be made of any material which is rigid or substantially rigid, e.g., metal, rigid thermoset polymeric materials, such as phenolic and epoxy resins, and the like. Similarly, any self-lubricating polymer may be used advantageously as the bearings. Other bearings may also be used which may or may not be self-lubricating, if they include a self-lubricant; however, self-lubricating polymers are considerably advantageous in this invention. Polytetrafluoroethylene polymers are preferred because of their toughness and resistance to wear and because of their high self-lubricating characteristics.

Other modifications may be made without departing from the spirit and scope of the invention as set forth in the following claims.

What is claimed:

1. A pedestal for adjustably supporting, positioning and orienting display consoles which include a display face, comprising:
a base for being mounted upon a supporting structure;
a hollow, partially spherical journal for supporting the display console;
a first bearing on the upper edge of the base for supporting in frictional sliding relationship the convex surface of the journal;
a second bearing positioned between the guide element and concave portion of the journal for supporting the guide element in frictional sliding relationship with the concave portion of the journal;
means for securing the first and second bearings in constant compression against the convex and concave surfaces respectively of the hollow, partially sperical journal;
the base, journal, guide element, first and second bearings and compression means being so disposed and constructed as to permit the supported console to be tilted and pivoted thereon by movement against constant frictional force as the first and second bearings slide over the concave and convex journal surfaces, said friction being sufficient by reason of the compression applied to the first and second bearings to maintain the console at a selected position and orientation without additional means; said first and second bearing formed of a low friction, cold flowable self-lubricating polymer and said compression means comprising resilient means under compression within the Hooke's law range of said means to maintain the frictional sliding relationship between the first and second bearings and the journals.

2. The pedestal of claim 1 wherein the base, the journal and the guide element respectively has a passage formed therethrough, said passages being aligned to permit an electrical cord to extend through the pedestal to the console.

3. The pedestal of claim 1 wherein the base, the journal and the guide element respectively has a passage formed therethrough, said passages being aligned to permit an electrical cord to extend through the pedestal to the console.

4. The pedestal of claim 1 further comprising stop means formed on the journal and coacting stop means on the base, said stop means limiting pivotal movement of the console to less than 180 degrees of rotational movement.

5. The pedestal of claim 4 wherein the base, the journal and the guide element respectively has a passage formed therethrough, said passages being aligned to permit an electrical cord to extend through the pedestal to the console.

6. The pedestal of claim 5 further comprising tilt and stop means on the journal and guide element to substantially prevent side-to-side tilting movement and to permit limited back-to-front tilting movement of the console.

7. The pedestal of claim 4 further comprising tilt guide and stop means on the journal and guide element to substantially prevent side-to-side tilting movement and to permit limited back-to-front tilting movement of the console.

8. The pedestal of claim 1 further comprising tilt guide and stop means on the journal and guide element to substantially prevent side-to-side tilting movement and to permit limited back-to-front tilting movement of the console.

9. A pedestal constructed and adapted to support a display console for limited pivotal left-to-right movement about a generally vertical axis, prevent substantial left-to-right tilting movement, and permit limited back-to-front tilting movement, comprising:
a journal in the configuration of a hollow, partial hemisphere having a concave upwardly oriented surface and a convex downwardly oriented surface;
means for attaching the console to the journal;
a base for receiving and supporting the convex surface of the journal;
a bearing for frictional sliding and supporting engagement between the base and the journal, said bearing adapted to frictionally ride over the convex surface of the journal;
guide means adapted to be supported by the concave surface of the journal;
a second bearing between the guide means and the journal, said second bearing constructed to frictional ride against and within the concave surface of the journal;
compression means maintaining the bearings in substantially constant compression and frictional relationship against the respective surfaces of the journal and in compression respectively against the guide means and the base, the compression within the Hooke's law limitation thereof and an elongate element extending through a generally centrally located passage in the journal;
the journal forming a guide slot therethrough for receiving the elongate element of the compression means and coacting therewith to permit limited front-to-back tilting of the console mounted on the journal, the bearings frictionally moving over the convex and concave journal surfaces respectively during such tilting movement;
the journal constructed and adapted to pivot about the elongate element to permit left-to-right pivotal movement of the console about an axis corresponding to the longitudinal axis of the elongate element; and
means on the journal and the base, respectively, for limiting the extent of left-to-right pivotal movement of the journal.

10. The pedestal of claim 9 further comprising means on the concave surface of the journal for substantially preventing sliding movement of the guide means in a side-to-side direction while permitting limited front-to-back sliding movement of the guide means on the second bearing in the concave surface of the journal.

11. The pedestal of claim 10 further comprising means on the guide means for engaging the console to prevent relative pivotal movement between the console and the guide means.

12. The pedestal of claim 10 wherein the bearings comprise a low friction, cold flowable self-lubricating polymer, and the compression means comprises resilient means under compression with the Hooke's law range of said means to thereby maintain the frictional sliding relationship between the bearings and the journal.

13. The pedestal of claim 10 wherein the base, the journal and the guide element respectively has a passage formed therethrough, said passages being aligned to permit an electrical cord to extend through the pedestal to the console.

14. The pedestal of claim 13 wherein the bearings comprise a low friction, cold flowable self-lubricating polymer, and the compression means comprises resilient means under compression with the Hooke's law range of said means to thereby maintain the frictional sliding relationship between the bearings and the journal.

15. The pedestal of claim 14 further comprising means on the guide means for engaging the console to prevent relative pivotal movement between the console and the guide means.

16. A pedestal for adjustable supporting, positioning and orienting a display device comprising:
a base formed to be positioned upon a support surface;
a partially spherical journal for supporting the display device, said journal having a convex surface formed on one side disposed in frictional sliding relationship with said base, and a concave surface formed on its opposite side,
a guide element disposed in frictional sliding relationship with the concave surface of said journal; and
means for securing said journal, guide element and base in constant compression against one another by resilient means under compression within the Hooke's law range to maintain the frictional sliding relationship between said journal, base and guide element so as to permit the display device to be tilted and pivoted relative said base by movement against constant frictional force.

* * * * *